United States Patent [19]

Sato et al.

[11] Patent Number: 4,829,530
[45] Date of Patent: May 9, 1989

[54] APPARATUS OF CONTROLLING A LASER DEVICE

[75] Inventors: Katsuji Sato; Hiroo Takenaka; Katsumi Kiriyama, All of Tokyo, Japan

[73] Assignee: NEC Corporation, Japan

[21] Appl. No.: 38,142

[22] Filed: Apr. 14, 1987

[30] Foreign Application Priority Data

Apr. 15, 1986 [JP] Japan ................................. 61-87404

[51] Int. Cl.$^4$ .............................................. H01J 3/10
[52] U.S. Cl. .......................................... 372/9; 372/29; 372/33; 372/38
[58] Field of Search ......................... 372/9, 25, 29-33, 372/38, 69, 81, 82, 70

[56] References Cited

FOREIGN PATENT DOCUMENTS

| 0032295 | 3/1977 | Japan | 372/38 |
| 0142995 | 11/1979 | Japan | 372/38 |
| 56-115591 | 2/1980 | Japan | . |
| 0078190 | 5/1982 | Japan | 372/70 |

Primary Examiner—William L. Sikes
Assistant Examiner—B. Randolph Holloway
Attorney, Agent, or Firm—Ostrolenk, Faber, Gerb & Soffen

[57] ABSTRACT

An apparatus for controlling a laser device comprises means for outputting at least two levels of reference voltage from which a reference voltage is selected in accordance with the consecutive excited time of a laser rod which is excited to emit laser light by a light source. The light source is turned on under a charged voltage of capacitance th level of which is controlled in comparison with the reference voltage so that the laser light is precisely controlled in its energy density and radiation angle to avoid the influence of thermal lens effect of the laser element. This is accomplished by selecting an appropriate level of the reference voltage from the two or more levels of reference voltage.

3 Claims, 4 Drawing Sheets

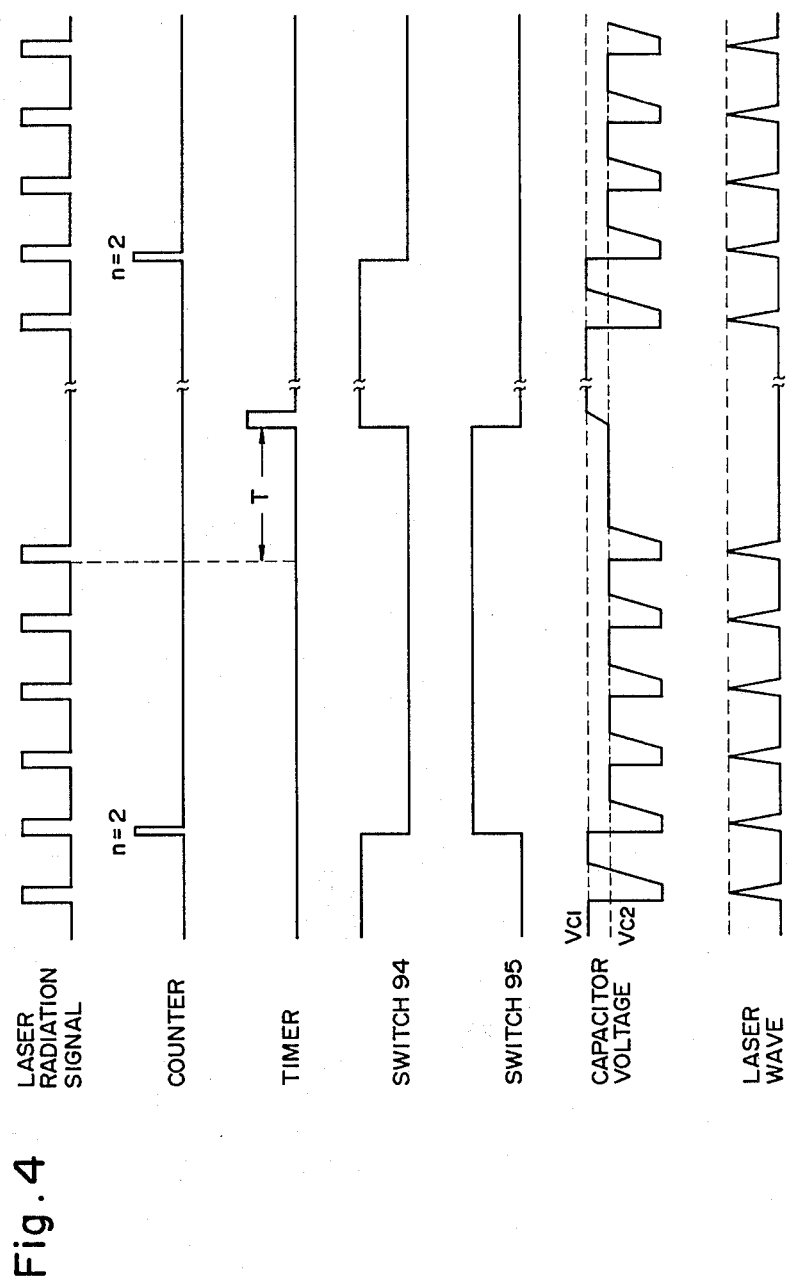

4,829,530

APPARATUS OF CONTROLLING A LASER DEVICE

FIELD OF THE INVENTION

The invention relates to an apparatus for controlling a laser device, and more particularly to an apparatus for controlling a laser device in which the energy density and radiation angle laser light are controlled in a manner to avoid a thermal lens effect on a laser rod.

BACKGROUND OF THE INVENTION

A conventional laser device is described in Japanese laid open No. 56-115591(115591/1981), the laid open date of which is Sept. 10, 1981. The laser device comprises a DC power source having a plurality of output terminals for a plurality of different predetermined voltages; a plurality of semiconductor switches for selecting one of the different predetermined voltages; means for selecting one of the semiconductor switches to be turned on; a capacitor to be charged through a selected switch from the DC power source; a flash lamp for a light source to be turned on in accordance with the charged voltage of the capacitor; and a laser rod to be excited in accordance with light from the flash lamp.

In operation, one of the semiconductor switches is turned on, depending upon an energy level of laser light which is required in laser machining, so that the capacitor is charged to a predetermined level of voltage in accordance with a charging voltage from the corresponding output terminal of the DC power source. The flash lamp is turned on in accordance with the charged voltage of the capacitor so that light radiates from the flash lamp thereby exciting the laser rod to emit laser light. The laser light thus emitted is focussed through an optical system on the surface of a hard article, such as metal, so that laser machining or drilling an aperture, cutting, welding etc. Of the hard article are carried out. In the laser device, it is possible to change the energy level of the laser light at high speed without difficulty simply by turning on one of the semiconductor switches.

According to the foregoing conventional laser device, however, there is a disadvantage that laser light is affected by thermal lens effect of the laser rod. In more detail, the laser rod functions as a concave lens during the starting period of excitation when a flash lamp for exciting the laser rod is turned on and off with a shorter cycle than the thermal relaxation time of the laser rod. This may happen because the temperature of the laser rod initially is higher in its cross section at its inner peripheral portion than at its central portion. On the other hand, the laser rod functions as a convex lens after it reaches thermal equilibrium because the temperature of the laser rod is higher in its cross section at its central portion than at its inner peripheral portion. For this reason, a laser rod is generally cooled from its outer periphery by water.

Therefore, defective laser machining of an article occurs due to fluctuation of the energy density of produced laser light as a result of the thermal lens effect occuring during excitation of a laser rod as mentioned above.

Additionally, another conventional laser device includes a shutter means provided on a laser light axis to shut off laser light from a laser rod before the rod reaches thermal equilibrium and to pass laser light thereafter to permit laser machining to run.

The latter laser device, however, has the disadvantage that laser light is not effectively utilized and the life of a flash lamp is thereby shortened.

SUMMARY OF THE INVENTION

Accordingly, an object of the invention is to provide an apparatus for controlling a laser device in which laser light is unaffected by thermal lens effect of a laser rod.

A further object of the invention is to provide an apparatus for controlling a laser device in which the fluctuation of the energy density of laser light is prevented whereby laser machining may be carried out with higher precision.

A still further object of the invention is to provide an apparatus for controlling a laser device in which the laser radiation angle is kept constant.

A further object of the invention is to provide an apparatus for controlling a laser device in which laser light is effectively utilized and the life of a flash lamp is maintained for a predetermined time.

According to a preferred form of the invention, there is provided an apparatus for controlling a laser device which comprises;

a light source for exciting a laser rod from which laser light radiates;

a capacitor to be charged to a predetermined voltage at which the light source is turned on to emit light for exciting the laser element;

means for applying a voltage across the capacitor for charging the capacitor to the predetermined voltage; and means for controlling the means for applying a voltage across the capacitor to decrease the predetermined voltage by a predetermined level when the laser rod reaches thermal equilibrium.

BRIEF DESCRIPTION OF THE DRAWINGS

The invention will be explained in more detail in accordance with following drawings, wherein;

FIG. 4 is a timing chart showing operation of a embodiment of the invention.

DESCRIPTION OF THE PREFERRED EMBODIMENT

Figure 1:
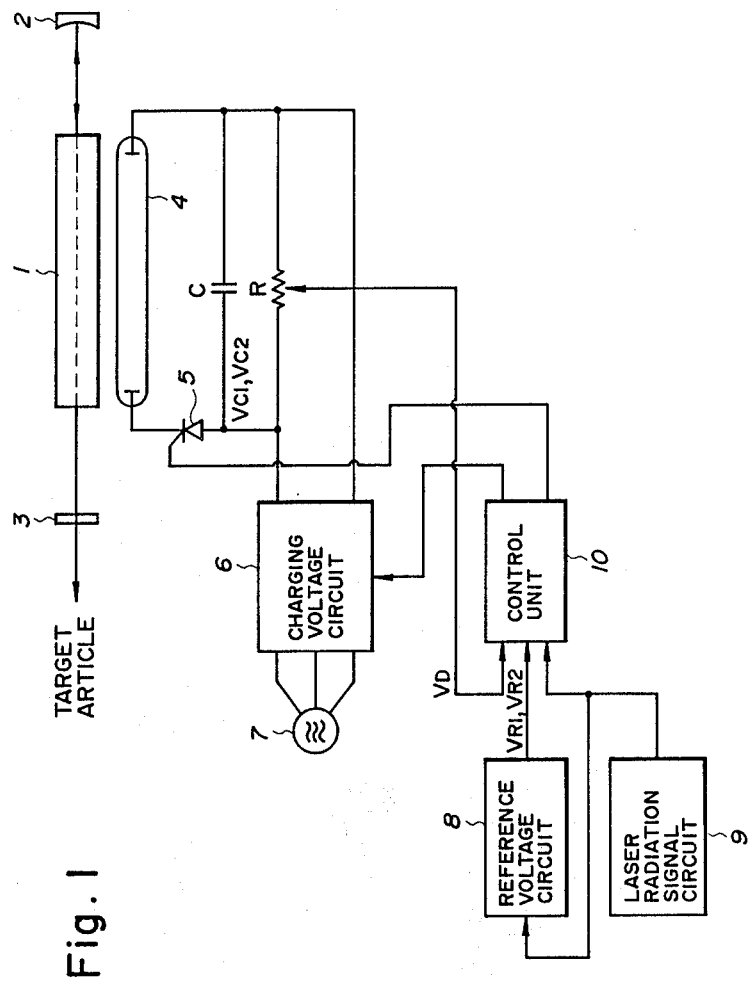
FIG. 1 is a block diagram showing an embodiment of the invention.

In FIG. 1, there is shown an apparatus for controlling a laser device in an embodiment of the invention. The apparatus comprises a laser rod 1 from which laser light radiates; a reflecting mirror 2 and an output mirror 3 which are positioned, respectively, on opposite sides of the laser rod 1; a light source such as a flash lamp 4 for exciting the laser rod 1; a capacitor C to be charged to an predetermined voltage to be applied through a SCR 5 across the flash lamp 4; a resistance R which is parallel to the capacitor C to detect the charged voltage thereof in accordance with a divided voltage thereof; a charging voltage circuit 6 which outputs a voltage to be applied across the capacitor C in accordance with a voltage of a three-phase power source 7; a reference voltage circuit 8 which outputs two reference voltages $V_{R1}$ and $V_{R2}$ in accordance with the consecutive excited time of the laser rod 1; a laser radiation signal circuit 9 which generates laser radiation pulse signals of predetermined frequency, period and width; and a control unit 10 by which the charging voltage circuit 6 is controlled to output two charging voltages $V_{C1}$ and $V_{C2}$ corresponding respectively to the two reference voltages $V_{R1}$ and $V_{R2}$. A higher voltage $C_1$ and $C_2$ of the at least two charging voltages is applied across the capacitor C for the starting period of the excitation of the laser rod 1, while the voltage thereof is applied across the capacitor C for the remaining period.

Figure 2:
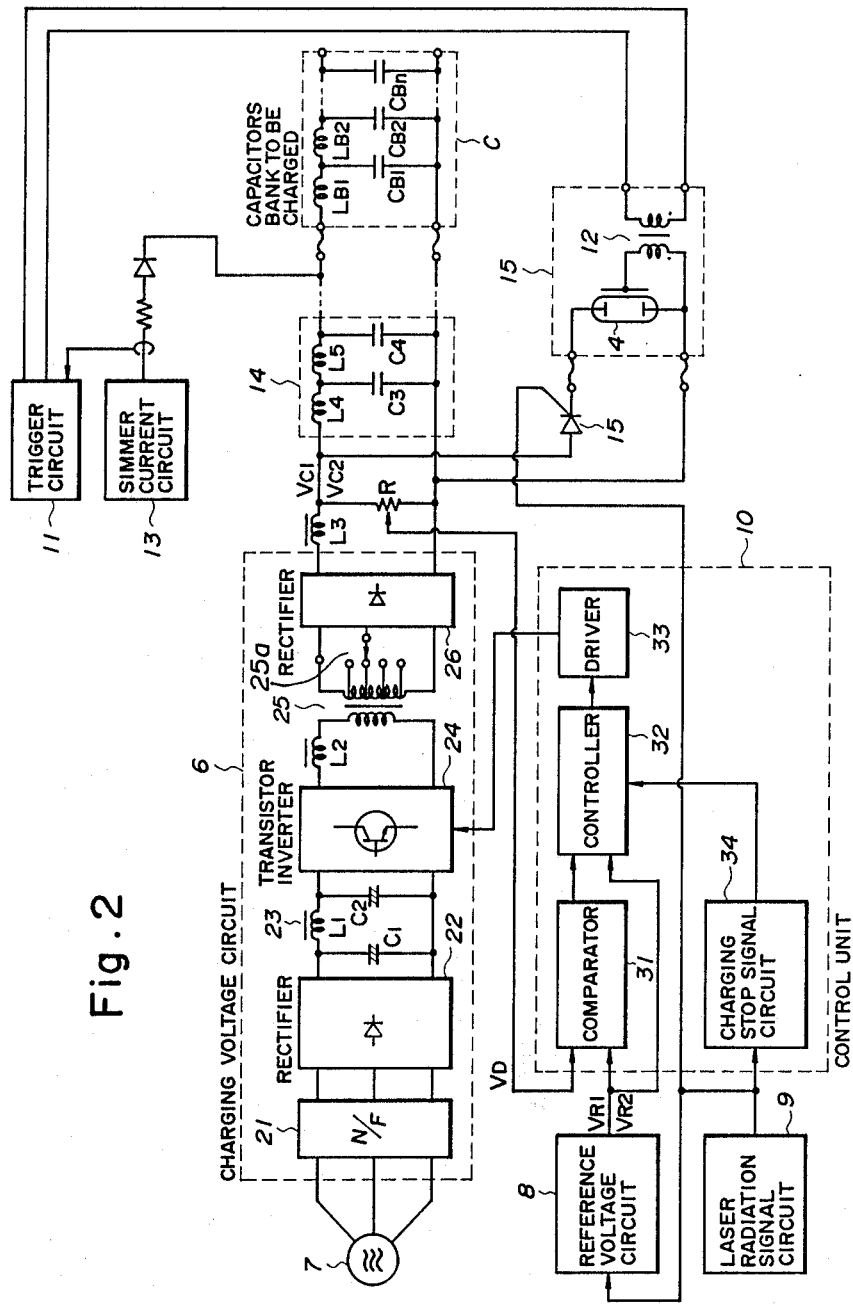
FIG. 2 is a block diagram showing the embodiment of FIG. 1 in more detail.

FIG. 2 shows an apparatus for controlling the laser device of FIG. 1 in more detail, wherein like parts are designated by like reference numerals and symbols. FIG. 2 additionally shows a trigger circuit 11, a trigger transformer 12 provided in a laser head 15, a simmer current circuit 13, and a pulse forming network 14. In the charging voltage circuit 6, a noise filter 21 is connected at its input to the a 200 V, three-phase power source 7 and at its output to a rectifier 22 to which a smoothing circuit 23 including an inductance $L_1$ and capacitors $C_1$ and $C_2$ is connected. Connected to the smoothing circuit 23 is a transistor inverter 24 under the control of control unit 10, while a step-up transformer 25 is connected through an inductance $L_2$ to the transistor inverter 24. The step-up transformer 25 is provided with taps 25a through which a rectifier 26 is connected thereto, and an inductance $L_3$ is positioned between the rectifier 26 and resistance R.

The control unit 10 includes a comparator 31 for comparing the voltage $V_D$ detected by means of the resistance R with the reference voltage $V_{R1}$ or $V_{R2}$; a controller 32 for outputting control signals in accordance with an output of the comparator 31 and the reference voltage $V_{R1}$ or $V_{R2}$; a driver 33 for controlling the time ratio of the turning on and off of the transistor inverter 24 in accordance with a control signal from the controller 32; and a charging stop signal circuit 34 for outputting a signal for stopping operation of the driver 33 under the control of the controller 32 in accordance with a signal from the laser radiation signal circuit 9.

The trigger circuit 11 includes a capacitor (not shown) to be charged to a predetermined DC voltage and an SCR (not shown) through which pulse current is conducted to a primary winding of the trigger transformer 12 in the laser head 15. By the high speed turning on and off of the trigger circuit 11, a high pulse voltage of approximately $-20$ KV is produced at a secondary winding of the trigger transformer 12. The high pulse voltage is applied between a light collector and a cathode of flash lamp 4 to result in simmer current for the flash lamp 4 and is automatically produced when operation is started or the simmer current is shut off. In addition, the simmer current circuit 13 is provided for the following reason. That is, the simmer current, having a negative resistance characteristic, which is arc discharge current of approximately 150 mA like a preliminary discharge is flowed conducted through the flash lamp 4 between the intervals of flash of the lamp. For this reason, the trigger voltage is automatically produced to restore the simmer current prior to the following flash because the simmer current tends to diminish to zero in accordance with an external disturbance, especially at the time of flash. In this respect, laser radiation output is not obtained since the flash lamp 4 does not flash if the simmer current becomes zero. Further, the pulse forming network 14 is composed of a plurality of steps of LC circuits, for instance, including inductances $L_4$ and $L_5$, and capacitors $C_3$ and $C_4$ wherein the electric charge stored in such capacitor is discharged through the flash lamp 4 so that the waveform of the discharge current becomes nearly trapezoidal. Finally, the capacitor C shown in FIG. 1 appears in FIG. 2 as capacitor bank C including inductances $L_{B1}$, $L_{B2}$ ... and capacitors $C_{B1}$, $C_{B2}$ ... $C_{Bn}$.

Figure 3:
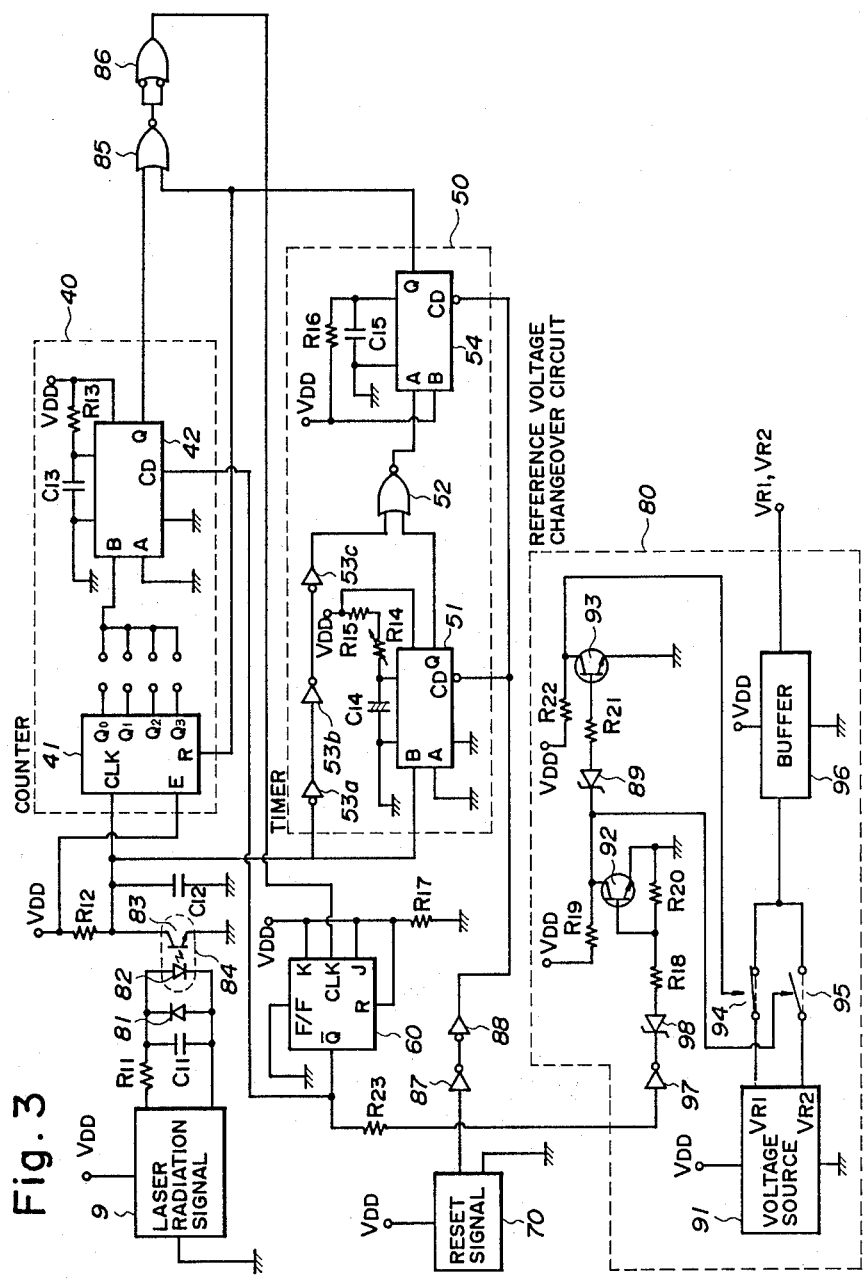
FIG. 3 is a block diagram showing a reference voltage circuit of FIGS. 1 and 2.

Next, there is shown in FIG. 3 the reference voltage circuit (i.e., item 8 in FIG. 2), which comprises a counter circuit 40, a timer circuit 50, a flip-flop 60, a reset signal circuit 70, and a reference voltage changeover circuit 80. Before explaining each of these circuits, it should be noted that reference symbols $R_{11}$ to $R_{23}$ designate resistances each having a predetermined resistance value and reference symbols $C_{11}$ to $C_{15}$ designate capacitors each having a predetermined capacitance value. Here, the respective circuits in FIG. 3 are explained as follows.

(a) COUNTER CIRCUIT 40

The counter circuit 40 comprises a counter 41 having a terminal CLK for receiving laser radiation signals to be explained in more detail later and terminals $Q_0$ to $Q_3$ for outputting the value (four bits) of counted laser radiation signals; and a circuit 42 for outputting a count signal from the counter 41 when the counter 41 has counted a predetermined number of laser radiation signals and wherein the count signal is applied to a terminal B of circuit 41 from one of the terminals $Q_0$ to $Q_3$. The width of the count signal is determined in the circuit 42 by the RC time constant of capacitor $C_{13}$ and resistance $R_{13}$, while one of the terminals $Q_0$ to $Q_3$ is selected depending upon a predetermined number of counted laser radiation signals, for example, 1 to 8. The counter 41 is connected to a phototransistor 83 which is part of a photocoupler 84 together with a photodiode 82, which is parallel to a diode 81. The photodiode 82 is driven by laser radiation signals from the laser radiation signal circuit 9.

(b) TIMER CIRCUIT 50

The timer circuit 50 comprises a timer 51 having a terminal B for receiving laser radiation signals and a terminal Q for outputting a timer signal when a predetermined time has elapsed after laser radiation signals are not input to the terminal B; a NOR circuit 52 having two terminals for receiving the timer signal from the counter 51 and laser radiation signals passed through inverters 53a, 53b and 53c, and a circuit 54 having a terminal A for receiving a signal from the NOR circuit 52 and a terminal Q for outputting the timer signal in accordance with signal applied to the terminal A. The predetermined time is set in the timer 51 in accordance with the RC time constant of electrolytic capacitor $C_{14}$ and variable resistance $R_{15}$ and is varied by adjusting the resistance value of the variable resistance $R_{15}$, while the width of the timer signal is determined in the circuit 54 in accordance with the RC time constant of capacitor $C_{15}$ and resistance $R_{16}$.

(c) FLIP-FLOP 60

The flip-flop 60 is connected via its terminal CLK through a NOR circuit 85 and an inverter 86 to the counter circuit 40 and the timer circuit 50 so that the flip-flop 60 outputs a changeover signal from a terminal $\overline{Q}$ depending upon the counter or timer signal.

(d) RESET SIGNAL CIRCUIT 70

The reset signal circuit 70 outputs a reset signal through inverters 87 and 88 to the respective terminals $C_D$ of the timer 51 and the circuit 54 so that the timer circuit 50 is controlled to be non-active before power source voltage $V_{DD}$ attains a predetermined level when the power source is turned on for operation thereof.

(e) REFERENCE VOLTAGE CHANGEOVER CIRCUIT 80

The reference voltage changeover circuit 80 comprises a voltage source circuit 91 producing two levels of reference voltages $V_{R1}$ and $V_{R2}$; transistors 92 and 93 connected through a zener diode 89 between collector and base to be turned on and off to assume different states in accordance with the changeover signal passed through an inverter 97 and a zener diode 98 from the flip-flop 60; analog switches 94 and 95 to be turned on and off in accordance with the turning on and off of the transistors 92 and 93; and a buffer circuit 96 for suppressing the fluctuation of the reference voltages $V_{R1}$ and $V_{R2}$ in accordance with that of the power source voltage.

In operation, laser radiation signals as shown in FIG. 4 are output from the laser radiation signal circuit 9 so that laser radiation signals are applied through the photocoupler 84 to the reference voltage circuit 8 and the control unit 10 respectively. In the reference voltage circuit 8, laser radiation signals are input to the terminal CLK of the counter 41 in which the predetermined number n is previously set to be "2" (n=2). Before counting two laser radiation signals, that is, when the outputs of the terminals $Q_0$ to $Q_3$ of the counter 41 are "0000" or "0001", the counter circuit 40 does not output any counter signal so that the changeover signal "0" which is the condition of the terminal $\overline{Q}$ of the flip-flop 60 is output through the inverter 97 and the zener diode 98 to the transistor 92. Consequently, the transistor 92 is turned on thereby to turn off the switch 95, while the transistor 93 is turned off thereby to turn on the switch 94 as shown in FIG. 4. As a result, the reference voltage $V_{R1}$ is output through the buffer circuit 96 of the reference voltage changeover circuit 80 in the reference voltage circuit 8 to the control unit 10. On the other hand, the three-phase voltage of 200 V from the power source 7 is applied through the noise filter 21 to the rectifier 22 to be rectified into DC voltage which is smoothed by the smoothing circuit 23. The smoothed DC voltage is passed through the transistor inverter 24 which is controlled by the control unit 10 as explained in more detail later to be stepped up to a predetermined level of voltage by the transformer 25. The voltage thus stepped up is rectified into a predetermined level of DC voltage $V_{c1}$ to charge the capacitors $C_{B1}, C_{B2} \ldots C_{Bn}$ of the capacitor bank C. In the control unit 10, the detected voltage $V_D$ into which the charging voltage $V_{c1}$ is divided by the dividing ratio of the resistance R is compared with the reference voltage $V_{R1}$ in the comparator 31. When the detected voltage $V_D$ becomes equal to the reference voltage $V_{R1}$, the transistor inverter 24 is turned off through the driver 33 in accordance with the control signal of the controller 32 which receives a signal from the comparator 31. As a result, the voltage of the capacitor bank C is increased to a predetermined voltage $V_{c1}$ as shown in FIG. 4 so that the flash lamp 4 is driven to flash in accordance with the turning on of the SCR5 by receiving a laser radiation signal from the laser radiation signal circuit 9 whereby the laser rod 1 is excited to emit laser light as shown in FIG. 4. The laser light thus emitted is reflected on the one side of the laser rod 1 by the reflecting mirror 2 and focussed through the output mirror 3 onto the other side thereof on a target article which is subject to laser machining.

When the counter 41 has counted two laser radiation signals, that is, when the outputs of the terminals $Q_0$ to $Q_3$ thereof have become "0010", the circuit 42 outputs the counter signal as shown in FIG. 4 (n=2) which is input through the NOR circuit 85 and the inverter 86 to the terminal CLK of the flip-flop 60 thereby outputting the changeover signal "1" from the terminal $\overline{Q}$ of the flip-flop 60 so that the transistor 92 is turned off thereby to turn on the switch 95, while the transistor 93 is turned on thereby to turn off the switch 94 as shown in FIG. 4. As a result, the reference voltage $V_{R2}$ is input to the control unit 10 so that the capacitor bank C is charged to the predetermined voltage $V_{C2}$ corresponding to the reference voltage $V_{R2}$, as shown in FIG. 4, in the same control process as explained in a case where the capacitor bank C is charged to the predetermined voltage $V_{c1}$. At this moment, the laser rod 1 is under the transitional situation where the laser rod 1 changes from a concave lens phenomenon to a convex lens phenomenon so that the same laser wave is obtained in the excitation of the laser rod 1, as shown in FIG. 4, because the voltage to be applied across the flash lamp 4 is decreased from $V_{C1}$ to $V_{C2}$. At the same time, the circuit 42 becomes non-active so as not to output a counter signal any more by receiving signal "1" at a terminal $C_D$ thereof from the terminal $\overline{Q}$ of the flip-flop 60.

Otherwise, when a predetermined time T has elapsed from the cessation of laser radiation signals, the timer 51 outputs 9 timer signal, as shown in FIG. 4, which is given from the circuit 54 through the NOR circuit 85 and the inverter 86 to the flip-flop 60 so that the flip-flop 60 outputs re-inverted changeover signal "0" from the terminal $\overline{Q}$ thereof. Consequently, the reference voltage $V_{R1}$ is output from the reference voltage circuit 8 to the control unit 10, as shown in FIG. 4, in the same control process mentioned before, while the circuit 42 becomes active by receiving the re-inverted signal at the terminal $C_D$ thereof. Therefore, the counter signal can be output from the counter circuit 40 at the following stage where laser radiation signals are output from the laser radiation signal circuit 9. In a case where laser radiation signals from the laser radiation signal circuit 9, the charging stop signal circuit 34 in the control unit 10 outputs charging stop signal to the controller 32 so that operation of the charging voltage circuit 6 is stopped.

As clearly understood from the embodiment mentioned above, reference voltages may be of more than three levels.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An apparatus for controlling a laser device, comprising:
   (a) a light source for exciting a laser rod from which laser light radiates;
   (b) a capacitance used to store energy for powering said light source;

(c) switching means for coupling said capacitance to said light source at selected times to cause said capacitance to discharge energy to power said light source;

(d) charging means for charging said capacitance to preselected, different voltage levels; and (e) control means to cause said charging means to charge said capacitance to an initial voltage level when said light source initially excites the laser rod and to a lower voltage level after the laser rod reaches thermal equilibrium; said control means comprising:

(i) means for generating a reference voltage whose level varies as a function of elapsed time from an initial excitation of said laser rod, said voltage level decreasing when the laser rod reaches thermal equilibrium; and (ii) means responsive to said reference voltage to cause said charging means to charge said capacitance to a respective voltage level corresponding to the value of said reference voltage.

2. The apparatus for controlling a laser device according to claim 1, wherein said means for generating a reference voltage comprises:

a counter circuit for counting incidence of laser radiation signals;

a timer circuit for measuring a predetermined time after cessation of said laser radiation signals; and reference voltage changeover means for generating a first reference voltage when said counter circuit has counted a predetermined number of laser radiation signals and for generating a second reference voltage, lower than said first reference voltage, when said timer circuit has measured said predetermined time.

3. An apparatus for controlling a laser device, comprising:

a light source for exciting a laser rod from which laser light radiates;

a capacitance used to store energy for powering said light source;

switching means for coupling said capacitance to said light source at selected times to cause said capacitance to discharge energy to power said light source;

charging means for charging said capacitance to preselected, different voltage levels; said charging means comprising a source of DC voltage and a switching element coupling said voltage source to said capacitance; and control means to cause said charging means to charge said capacitance to an initial voltage level when said light source initially excites the laser rod and to a lower voltage level after the laser rod reaches thermal equilibrium; said control means comprising means to switch said switching element into a conducting state for an interval during which said capacitance is charged from said voltage source, said interval being controlled to charge said capacitance to a respective voltage level as a function of elapsed time from an initial excitation of said laser rod.

* * * * *